US007277825B1

(12) United States Patent
Orfali et al.

(10) Patent No.: US 7,277,825 B1
(45) Date of Patent: Oct. 2, 2007

(54) APPARATUS AND METHOD FOR ANALYZING PERFORMANCE OF A DATA PROCESSING SYSTEM

(75) Inventors: Marwan A. Orfali, Woodbury, MN (US); Mitchell A. Bauman, Circle Pines, MN (US); Myoungran Kim, Blaine, MN (US)

(73) Assignee: Unisys Corporation, Blue Bell, PA (US)

( * ) Notice: Subject to any disclaimer, the term of this patent is extended or adjusted under 35 U.S.C. 154(b) by 0 days.

(21) Appl. No.: 10/423,100

(22) Filed: Apr. 25, 2003

(51) Int. Cl.
G06F 11/30 (2006.01)
(52) U.S. Cl. .................. 702/186; 702/182
(58) Field of Classification Search ............ 702/182, 702/186; 703/13, 14, 15, 21, 19, 6
See application file for complete search history.

(56) References Cited

U.S. PATENT DOCUMENTS

| | | | | |
|---|---|---|---|---|
| 4,868,770 A | * | 9/1989 | Smith et al. | 703/14 |
| 5,092,780 A | * | 3/1992 | Vlach | 434/433 |
| 5,402,358 A | * | 3/1995 | Smith et al. | 716/9 |
| 5,548,539 A | * | 8/1996 | Vlach et al. | 703/6 |
| 5,615,356 A | * | 3/1997 | King et al. | 703/21 |
| 5,852,564 A | * | 12/1998 | King et al. | 703/14 |
| 5,963,724 A | * | 10/1999 | Mantooth et al. | 703/14 |
| 6,236,956 B1 | * | 5/2001 | Mantooth et al. | 703/14 |
| 6,292,766 B1 | * | 9/2001 | Mattos et al. | 703/14 |
| 6,389,381 B1 | * | 5/2002 | Isoda et al. | 703/19 |

* cited by examiner

Primary Examiner—John Barlow
Assistant Examiner—Stephen J. Cherry
(74) Attorney, Agent, or Firm—Beth L. McMahon; Charles A. Johnson; Mark T. Starr

(57) ABSTRACT

An improved system and method for completing performance analysis for a target system is disclosed. According to the current invention, different types of configurations files are created, each to describe one or more respective aspects and/or portions of the target system. Each of these file types may include a combination of parameter values and equations that represent the respective portion of the system. After the configuration files are defined, scenarios are created. Each scenario includes a set of configuration files, with some or all of the files being of different file types. The files included within a scenario provide all parameter values and equations needed to calculate performance data for a particular revision of the target system. Next, a performance study is defined to include one or more of the scenarios. Finally, performance data is derived for each of the scenarios in the performance study.

35 Claims, 12 Drawing Sheets

SCENARIO MANAGER

300 →   (LOAD)  (RE-LOAD)  (LOAD & RUN)  (RUN)  (SAVE)  (EXIT)

BY: (AUTHOR)                                                          ON: (DATE)

| | | | | | |
|---|---|---|---|---|---|
| COMMENT: DELAYED PURGE ACK STUDY | | | | | |
| SCENARIOS: | A1 | A2 | A3 | A4 | A5 |
| SYSTEM | sys1 | sys2 | sys3 | sys4 | |
| REVISION | v5f | v3 | v2 | v6b | |
| COMMENT | | | | | |
| PCT.SNP.STALL | 0% | 0% | 0% | 0% | |
| SDRAM.ADD | | | | | |
| MSU.DLYD.INV.ACK | N | Y | N | Y | |
| IPS.PERFSB | 4 | 4 | 4 | 4 | |
| MSUs | | | | | |
| TLC.OPTION | SNC | SNC | SNC | SNC | |
| XCFG | | | | | |
| CONFIG | ALL | ALL | ALL | ALL | |
| CPU | ExPROC | ExPROC | ExPROC | ExPROC | |
| REVISION | v6 | v6 | v6 | v6 | |
| CPU.MHZ | 5000 | 5000 | 4000 | 4000 | |
| FSB.MHZ | | | | | |
| SLC.NOM.SIZE | 4 | 4 | 4 | 4 | |
| MULTICORES | 1 | 1 | 1 | 1 | |
| WORKLOAD | TPCC | TPCC | TPCC-HT | TPCC-HT | |
| REVISION | v1c | v1c | v1c | v1c | |
| THREAD SHARING% | 100% | 100% | 100% | 100% | |
| OUTPUT SUMMARY | A1 | A2 | A3 | A4 | A5 |
| THROUGHPUT | | | | | |
| 1 X | 70,125 | 60,129 | 70,123 | 123,456 | |
| 2 X | 80,346 | 80,921 | 60,245 | 100,222 | |
| 4 X | 90,789 | 90,000 | 80,456 | 200,444 | |
| 8 X | 100,012 | 100,000 | 90,227 | 500,456 | |
| 16 X | 110,345 | 111,222 | 100,333 | 300,123 | |
| 32 X | 220,678 | 333,444 | 200,456 | 500,345 | |
| 64 X | 333,901 | 300,000 | 400,222 | 600,456 | |
| CPI | | | | | |
| 1 X | 7.123 | 7.120 | 8.126 | 10.234 | |
| 2 X | 8.456 | 9.340 | 9.678 | 11.567 | |
| 4 X | 9.789 | 10.125 | 10.910 | 12.890 | |
| 8 X | 10.012 | 12.256 | 13.123 | 14.001 | |
| 16 X | 11.346 | 11.345 | 14.285 | 16.012 | |
| 32 X | 13.621 | 15.679 | 16.120 | 17.004 | |
| 64 X | 16.126 | 17.127 | 17.134 | 18.005 | |
| MP FACTOR | | | | | |
| 1 X | 1.0 | 1.0 | 1.0 | 1.0 | |
| 2 X | 1.9 | 1.9 | 1.890 | 1.870 | |
| 4 X | 2.9 | 2.9 | 2.82 | 2.82 | |
| 8 X | 5.8 | 6.2 | 7.8 | 8.2 | |
| 16 X | 10.1 | 11.2 | 12.5 | 15.9 | |
| 32X | 20.5 | 20.5 | 25.0 | 26.0 | |
| 64 X | 30.5 | 30.7 | 30.5 | 30.8 | |

⟨A1 DETAIL SHEET⟩ ⟨A2 DETAIL SHEET⟩ ⟨A3 DETAIL SHEET⟩ ⟨A4 DETAIL SHEET⟩

*Figure 3A*

| BSBMHZ = SYS.MHZ | BACKSIDE BUS IS SAME SPEED AS SYSTEM CLOCK | | | | | |
|---|---|---|---|---|---|---|
| CONFIGURATIONS: | NAMES | | | | | |
| SYS MHZ | SYS.MHZ | 500 | | | | |
| BACK SIDE BUS INTERFACE MHz | BSBMHZ | 500 | | | | |
| CORE MHz | COREMHZ | 500 | | | | |
| BACK SIDE BUS CLOCK (ns) | BSBCLK | 1 | | | | |
| SYS CLOCK (ns) | SYSCLK | 1 | | | | |
| CORE CLOCK (ns) | CORECLK | 1 | | | | |
| FSB BUSY/LATENCY FLAG | FSB_BUSY_FLG | BUSY | | | | |
| TLC OPTION (NONE/FSB/SNC) | TLC.OPTION | SNC | | | | |
| TLC BANDPASS | TLC_BP_FLG | 10.4 | | | | |
| FREQUENCY OF SNOOP STALLS | PCT.SNP.STALL | 0% | | | | |
| SDAM LATENCY ADDER(SYSCLK) | SDRAM.ADD | | | | | |
| SPECULATIVE FETCH | SPEC_FETCH | N | | | | |
| BRIL SPECULATION CLOCKS SAVED | BRIL.SPECULATE | 0 | | | | |
| TLC HIT LATENCY SENSITIVITY | TLC_HIT_LAT_ADJ | 0 | | | | |
| TCT LATENCY ADDITIONAL CYCLE | TCT_RET_LAT_ADD | 0 | | | | |
| TCM LATENCY ADDITIONAL CYCLE | TCM_LAT_ADD | 0 | | | | |
| MT DATA I/F QUEUE ADDITIONAL CYCLE | MT_DATA_IP_ADD | 0 | | | | |
| MSU BANK LATENCY ADDER (SYSCLKs) | MSU.LAT.ADD | 0 | | | | |
| MSU INVALIDATE SHARED PDATA | MSU.DLYD.INV.ACK | N | | | | |
| SNOOP FILTER COHERENCY | SF.COHERENCY | Y | | | | |
| DIRECTORY CACHE HIT RATE | OWN.HIT | 100% | | | | |
| I/O CACHE LINE SIZE (BYTES/LINE) | IO.LINE.SIZE | 256 | | | | |
| I/O OFF SNC | IO.OFF.SNC | 1 | | | | |
| CONFIGURATION SELECTED | XCFG | 32X | | | | |
| XHUB SELECTED | XHUB.NOW | 1.0 | | | | |
| | | 1X | 2X | 4X | 8X | 16X |
| CONFIGURATION | CONFIGURATION | | | | | |
| IPs | IPs | 1 | 2 | 4 | 8 | 16 |
| MSUs | MSUs | 1 | 1 | 1 | 2 | 4 |
| NO. OF MSU I/Fs(SI) | MSU_IFs | 2 | 2 | 2 | 4 | 8 |
| BANKS | BANKs | 8 | 8 | 8 | 16 | 32 |
| NO. OF SNC I/Fs(ST) | ST_IFs | 1 | 1 | 1 | 4 | 8 |
| NO. OF XBAR I/Fs | XI_IFs | 2 | 2 | 2 | 4 | 8 |
| NO. OF DIRECTORY CONTROLLERS(DC) | DCs | 2 | 2 | 2 | 4 | 8 |
| NO. OF DIRECTORY BANKS | DC_BANKs | 8 | 8 | 8 | 16 | 32 |
| IPS PER FSB | IPS.PER.FSB | 4 | 4 | 4 | 4 | 4 |
| FSBs | FSBs | 1 | 1 | 1 | 2 | 4 |
| BSBs | BSBs | 1 | 1 | 1 | 2 | 4 |
| SNCs | SNCs | 1 | 1 | 1 | 2 | 4 |
| SNC GROUPS | GRPs | 1 | 1 | 1 | 1 | 2 |
| XBAR HUB BETWEEN GROUPS | XHUB | 0 | 0 | 0 | 0 | 0 |
| TLCs PER SYSTEM | TLCs | 1 | 1 | 1 | 2 | 4 |
| L3 SIZE (MB) | TLC.SIZE | 64 | 64 | 64 | 64 | 64 |
| L3 LOGICAL COUNT | LOGICAL.TLCs | 1 | 1 | 1 | 2 | 4 |
| WRONG TAG AS PERCENT OF BRLDs | STAG.PCT.BRLD | 0% | 0% | 0% | 3% | 2% |
| SLC MISS RATE DEGRADE FOR SENSITIVITY | PCT.L2.DEG | 0% | 0% | 0% | 0% | 0% |
| TLC MISS RATE DEGRADE FOR SENSITIVITY | PCT.L3.DEG | 20% | 10% | 0% | 0% | 0% |

Figure 4 *System Configuration File Sheet*

| CPU CHARACTERIZATION | | ExPROC | | | | |
|---|---|---|---|---|---|---|
| CPU TYPE | CPU.TYPE | 2200 | | | | |
| ON CHIP MULTICORE | MULTICORES | 1 | | | | |
| MULTITHREAD PER CPU | MULTITHREAD | 1 | | | | |
| L1 PER CPU | L1PERCPU | 1 | | | | |
| L2 PER CPU | L2PERCPU | 1 | | | | |
| CPU MHz | CPU.MHZ | 5000 | | | | |
| FSB MHZ | FSB.MHZ | 500 | | | | |
| CPU CLOCK (ns) | IPCLK | .02 | | | | |
| FSB CLOCK (ns) | PBCLK | 2 | | | | |
| ZLC SIZE (KB) | ZLC.SIZE | 0 | | | | |
| FLC SIZE (KB) | FLC.SIZE | 512 | | | | |
| FLC LINE SIZE (BYTES) | FLC.LINE | 512 | | | | |
| SLC SIZE (MB) | SLC.NOM.SIZE | 4 | | | | |
| SLC LINE SIZE (BYTES) | SLC.LINE | 128 | | | | |
| SLC EFFECTIVE SIZE (ME | SLC.SIZE | 4 | | | | |
| INSTRUCTION EXPANSION | IEF | 1 | | | | |
| RFO-TO-WRT RATIO | RFO.WRT | 0 | | | | |
| INV-TO-WRT RATIO | INV.WRT | 1 | | | | |
| USE OWNERSHIP TRANSFER | USE.OWN.XFER | 0 | | | | |
| REPLACEMENT XACTION | REPL.TRAMS.VAL | N | | | | |
| ENABLE DEFER REPLY | DfrReply | 1 | | | | |
| BASE CPI L0 | BASE.CPI | 2.500 | | | | |
| MULTITHREAD SWITCH | SMT.SWITCH.LAT | 0 | | | | |
| FLC LATENCY-INST READ | FLC.I.LAT | 0.0 | | | | |
| FLC LATENCY-DATA READ | FLC.D.LAT | 0.0 | | | | |
| FLC LATENCY-DATA WRITE | FLC.W.LAT | 0.0 | | | | |
| SLC LATENCY-INST READ | SLC.I.LAT | 1.0 | | | | |
| SLC LATENCY-DATA READ | SLC.D.LAT | 2.0 | | | | |
| SLC LATENCY-DATA WRITE | SLC.W.LAT | 5.0 | | | | |
| FSB ARBITRATION | FSB.ARB | .5 | ADDED TO MISS LATENCY | | | |
| INTERNAL DATA PROP | DATA.PROP | .5 | ADDED TO MISS LATENCY | | | |
| | | 1X | 2X | 4X | 8X | 16X |
| SPECULATION MISS FACTOR | SPRATIO | 1 | 1 | 1 | 1 | 1 |
| ZLC INST READ MISSES | ZLC.I.MPI | 7.50% | 7.50% | 7.50% | 7.50% | 7.50% |
| ZLC DATA READ MISSES | ZLC.D.MPI | 2% | 2% | 2% | 2% | 2% |
| ZLC DATA WRITE MISSES | ZLC.W.MPI | 2.40% | 2.40% | 2.40% | 2.40% | 2.40% |
| ZLC BLOCKING FACTOR-I | ZLC.I.BF | 5% | 5% | 5% | 5% | 5% |
| ZLC BLOCKING FACTOR-D | ZLC.D.BF | 30% | 30% | 30% | 30% | 30% |
| ZLC BLOCKING FACTOR-W | ZLC.W.BF | 20% | 20% | 20% | 20% | 20% |
| FLC BLOCKING FACTOR-IN | FLC.I.BF | 15% | 15% | 15% | 15% | 15% |
| FLC BLOCKING FACTOR-D | FLC.D.BF | 50% | 50% | 50% | 50% | 50% |
| FLC BLOCKING FACTOR-W | FLC.W.BF | 15% | 15% | 15% | 15% | 15% |
| SLC BLOCKING FACTOR-IN | SLC.I.BF | 90% | 90% | 90% | 90% | 90% |
| SLC BLOCKING FACTOR-D | SLC.D.BF | 90.0% | 90.0% | 90.0% | 90.0% | 90.0% |
| SLC BLOCKING FACTOR-W | SLC.W.BF | 90.0% | 90.0% | 90.0% | 90.0% | 90.0% |
| SPIN CPI FOR CALIBRATION | SPIN.CPI | 1.40 | 1.40 | 1.40 | 1.40 | 1.40 |

CPU Characterization File Sheet

*Figure 5*

| WORKLOAD CHARACTERIZATION | | | | | | |
|---|---|---|---|---|---|---|
| | | 1X | 2X | 4X | 8X | 16X |
| PROC INSTR/WU | WU.INSTR | 24563.68 | 24563.68 | 24563.68 | 24596.25 | 26166.4 |
| DISK IO/WU | WU.IO | 1 | 1 | 0.99 | 0.99 | 0.99 |
| INTRPTS/WU | WU.INTRPT | 0 | 0 | 0 | 0 | 0 |
| MESSAGES/WU | WU.MSG | | | | | |
| THREAD WS SHARING IN CACHE | THREADSHARING | 100% | 100% | 100% | 100% | 100% |
| PARTIAL BUS TRANSACTIONS TO IO | BUS.PART.MPI | 0.009% | 0.009% | 0.009% | 0.009% | 0.009% |
| IO MEM READ (BYTE/WU) | IO.MEM.RD | 1,970 | 1,970 | 1,970 | 1,970 | 1,970 |
| IO MEM WRITE (BYTE/WU) | IO.MEM.WRT | 4,357 | 4,357 | 4,357 | 4,357 | 4,357 |
| SPININSTR/WU | SPIN.INSTR | 0 | 0 | 0 | 0 | 0 |

*Workload Characterization File Sheet*

*Figure 6A*

256KB MISSES

| NUMBER OF CACHES | No. FLCs | 1 | 2 | 4 | 8 | 16 | 32 | 64 |
|---|---|---|---|---|---|---|---|---|
| ToT | FLC.T.MPI | 0.648% | 0.904% | 1.163% | 1.306% | 1.404% | 1.467% | 1.517% |
| IRD | FLC.I.MPI | 0.176% | 0.202% | 0.232% | 0.267% | 0.306% | 0.352% | 0.404% |
| DRD | FLC.D.MPI | 0.363% | 0.546% | 0.729% | 0.828% | 0.883% | 0.903% | 0.906% |
| RFO | FLC.W.MPI | 0.088% | 0.120% | 0.150% | 0.163% | 0.167% | 0.166% | 0.162% |
| INV | FLC.INV.MP | 0.021% | 0.036% | 0.051% | 0.049% | 0.047% | 0.046% | 0.045% |
| HitM | FLC.HM.MP | 0.000% | 0.037% | 0.065% | 0.081% | 0.091% | 0.095% | 0.096% |
| WB | FLC.WB.MP | 0.211% | 0.211% | 0.265% | 0.288% | 0.299% | 0.294% | 0.285% |

Workload Characterization Sheet – FLC Miss Rate

*Figure 6B*

| | A | B | C | D | E | F | G |
|---|---|---|---|---|---|---|---|
| 428 | FSB ADDRESS (FSBs) | FSB.A.UTIL | 9.54% | 23.45% | 49.27% | 52.23% | 51.33% |
| 429 | FSB DATA (FSBs) | FSB.D.UTIL | 8.16% | 23.67% | 53.71% | 52.15% | 48.20% |
| 430 | TLC DIRECTORY (TLCs) | TLC.TAG.UTIL | 6.13% | 13.98% | 28.75% | 30.24% | 29.05% |
| 431 | TLC DATA (TLCs) | TLC.D.UTIL | 3.04% | 8.70% | 20.81% | 19.26% | 16.84% |
| 432 | BSB ADDRESS (BSBs) | BSB.A.UTIL | | | | | |
| 433 | BSB DATA (BSBs) | BSB.D.UTIL | | | | | |
| 434 | SNC, ADR TO MSU (ST_IFs) | ST.A.MSU.UTIL | 1.03% | 1.92% | 3.36% | 2.78% | 2.66% |
| 435 | SNC, DATA TO MSU (ST_IFs) | ST.D.MSU.UTIL | 1% | 2% | 3% | 7% | 10% |
| 436 | MSU ADR TO MSU (XI_IFs) | XI.A.UTIL | 1% | 2% | 3% | 4% | 5% |
| 437 | MSU DATA TO MSU (XI_IFs) | XI.D.UTIL | 3% | 6% | 9% | 12% | 16% |
| 438 | DIRECTORY CACHE (DCs) | DC.TAG.UTIL | 1.25% | 2.13% | 3.42% | 3.50% | 3.96% |
| 439 | DIRECTORY MEM (DC_BANKs) | DC.DIR.UTIL | 9.51% | 16.95% | 28.59% | 24.03% | 32.39% |
| 440 | MSU ADR TO SNC (ST_IFs) | ST.A.SNC.UTIL | 1.03% | 1.92% | 3.36% | 4.21% | 4.92% |
| 441 | MSU DATA TO SNC (ST_IFs) | ST.D.SNC.UTIL | 5.13% | 9.59% | 16.82% | 24.24% | 24.27% |
| 442 | MSU, ADR TO AR (MSU_IFs) | MSU.AR.UTIL | 1.33% | 2.35% | 3.95% | 4.46% | 4.18% |
| 443 | MSU, DATA TO MSEG (MSU_IFs) | MSU.DSEG.UTIL | 6.03% | 11.04% | 19.06% | 15.52% | 15.32% |
| 444 | BLANK | | | | | | |

*Model Sheet – Busy Rate Calculation*

Figure 7A

|   | A | B | C | D | E | F | G |
|---|---|---|---|---|---|---|---|
| 469 | PATH QUEUE LATENCY (nsec): | | | | | | |
| 470 | L2 SAME FSB (LOCAL L2) | | 2.9327 | 8.6854 | 25.1944 | 25.4312 | 23.3518 |
| 471 | L2 OTHER BUS SAME SNC | | 7.4641 | 21.6547 | 61.6211 | 62.9864 | 58.3489 |
| 472 | GRP L2/LCL DIR | | 11.7522 | 29.7725 | 76.7047 | 83.2455 | 82.8803 |
| 473 | GRP L2/GRP DIR | | 11.7522 | 29.7725 | 76.7047 | 83.2455 | 82.8803 |
| 474 | RMT L2/GRP DIR | | 11.7522 | 29.7725 | 77.9695 | 83.2455 | 99.0411 |
| 475 | GRP L2/RMT DIR | | 12.0802 | 30.4227 | 77.9695 | 85.2329 | 90.3285 |
| 476 | RMT L2/RMT DIR | | 12.0802 | 30.4227 | 77.9695 | 85.2329 | 103.7958 |
| 477 | LOCAL TLC HIT | | 3.0708 | 9.0895 | 26.2103 | 26.3652 | 24.1601 |
| 478 | GRP TLC/LCL DIR | | 10.4183 | 25.3712 | 62.7425 | 69.9383 | 71.1739 |
| 479 | GRP TLC/GRP DIR | | 10.4183 | 25.3712 | 62.7425 | 69.9383 | 71.1739 |
| 480 | RMT TLC/GRP DIR | | 10.4183 | 25.3712 | 62.7425 | 69.9383 | 87.3348 |
| 481 | GRP TLC/RMT DIR | | 10.7462 | 26.0213 | 64.0073 | 71.9257 | 78.6221 |
| 482 | RMT TLC/RMT DIR | | 10.7462 | 26.0213 | 64.0073 | 71.9257 | 92.0895 |
| 483 | LCI MSU | | 17.9484 | 38.2665 | 83.3236 | 80.5195 | 91.8172 |
| 484 | GRP MSU | | 17.9484 | 38.2665 | 83.3236 | 80.5195 | 91.8172 |
| 485 | RMT MSU | | 18.5355 | 39.4055 | 85.4588 | 85.1559 | 104.3291 |
| 486 | GRP MSU + GRP INVALIDATE | | 17.9484 | 38.2665 | 83.3236 | 80.5195 | 91.8172 |
| 487 | GRP MSU + RMT INVALIDATE | | 17.9484 | 38.2665 | 83.3236 | 80.5195 | 91.8172 |
| 488 | RMT MSU + RMT INVALIDATE | | 17.9484 | 38.2665 | 83.3236 | 80.5195 | 107.9781 |
| 489 | WRONG TAG/GRP DIR | | 11.5029 | 27.2881 | 65.9994 | 70.8247 | 71.4288 |
| 490 | WRONG TAG/RMT DIR | | 11.5029 | 27.2881 | 65.9994 | 70.8247 | 88.3592 |
| 491 | PARTIAL TRANSACTIONS TO IO | | 4.2998 | 11.2292 | 29.3850 | 33.1959 | 36.9262 |

*Model Sheet – Queuing Time Calculations Based on Busy Rates*

*Figure 7B*

| | |
|---|---|
| BAIET | =Model!$C$29:$I$29 |
| BANKs | =Input!$C$125:$P$125 |
| BASE.CPI | =Input!$C$66 |
| BRIL.SPEC.LAT.M | =Model!$C$237:$I$237 |
| BRIL.SPEC.LAT.Q | =Model!$C$244:$I$244 |
| BRIL.SPEC.LAT.T | =Model!$C$230:$I$230 |
| BRIL.SPEC.MPI | =Model!$C$215:$I$215 |
| BRIL.SPECULATE | =Input!$C$107 |
| BSB.A.UTIL | =Model!$C$432:$I$432 |
| BSB.D.UTIL | =Model!$C$433:$I$433 |
| BSBCLK | =Input!$C$98 |

Name Table

*Figure 8*

| SYSTEM | REVISION | FILE NAME | PATH |
|---|---|---|---|
| sys1 | v4f | system1-4 | c:\system\system1 |
| sys1 | v5f | system1-5 | c:\system\system1 |
| sys2 | v4f | system2-4 | c:\system\system2 |
| sys2 | v5f | system2-5 | c:\system\system2 |
| sys3 | v5f | system3-5 | c:\system\system3 |
| sys3 | v6f | system3-6 | c:\system\system3 |
| sys4 | v5f | system4-5 | c:\system\system4 |
| sys4 | v6f | system4-6 | c:\system\system4 |

Index File

*Figure 9*

APPARATUS AND METHOD FOR ANALYZING PERFORMANCE OF A DATA PROCESSING SYSTEM

FIELD OF THE INVENTION

The following invention relates generally to a tool for analyzing the performance of a data processing system; and, more particularly, relates to a system and method for employing modular scenarios to compare the performance of various data processing system configurations.

BACKGROUND OF THE INVENTION

Modern data processing systems are becoming increasing modular. The systems are configured so that users may select a system that meets their processing and memory needs. For example, the ES7000 system commercially available from Unisys Corporation may be configured to allow users to add up to 32 processors to the system, based on their individual requirements. These processors need not all be of the same type. For example, some of the processors may be selected from those commercially available from the Unisys Corporation, while others are selected from those commercially available from Intel Corporation. As these processors are added to the system, additional cache memories and processor interfaces must also be included within the system. Additional memory may also be added in predetermined increments. Input/Output units and mass storage may further be included. This approach allows a user to tailor a system to their specific needs.

Modular systems are beneficial from a marketing standpoint. The same system architecture can be used to support a large number of product offerings. However, from a design and development standpoint, these types of systems provide special challenges. Each system configuration must be analyzed to ensure proper operation. Additionally, performance characteristics of the various configurations must be determined. Optimally, this type of analysis will be performed while the system is still in the design phase so that design problems may be more easily addressed.

One way to perform performance analysis is using a performance analysis tool. Such tools have been developed to provide performance data for an associated data processing system. Some of these tools use queuing equations to model the system. For example, a set of equations may be developed to model the latency associated with a given type of request to memory. These equations will take into account the minimum latency governed by intrinsic propagation delays, and will also take into consideration queuing times that are affected by the amount of request traffic within the system. The intrinsic propagation delays are affected by system parameters such as clock, bus, processor, and memory speeds. Other examples of variables that can affect the intrinsic delays include memory size, the number of instruction and I/O processors within the system, and the existence and size of various cache memories within the system.

Prior art performance tools of the type discussed above receive as an input a single comprehensive model that provides all of the parameter values necessary to perform the analysis. This model provides values for all system variables, including request levels, clock and bus speeds, and the size and/or type of some or all of the components (e.g., memories and processors) within the system. These values are entered into the queuing equations so that latency of the various paths within the system can be determined, and throughput may be calculated.

The performance analysis technique described above is generally an iterative process. For example, if a system designer wants to compare a current system configuration to another configuration, the designer creates another copy of the current model, and changes one or more parameters. For instance, the designer may create a second model that includes a larger main memory. This model can be saved, and the queuing equations can be re-evaluated so that latency and system throughput values are obtained for the second model. These values can then be compared to those for the first model.

The prior art mechanism discussed in the foregoing paragraphs has its drawbacks. As discussed, the models may be very large, particularly where large-scale data processing systems are concerned. For this reason, a large amount of storage space may be consumed to store multiple models. If many models are needed to complete an exhaustive study of all possible system configurations, the storage space required for this effort may become prohibitive. However, if the models are not saved after a particular analysis is performed, they may need to be re-created later if some aspect of the study must be re-performed. This can be very time-consuming. Additionally, evaluation of performance data is generally performed during a manual process that compares the latency and throughput data of one model to one or more other models. This manual comparison is tedious and error prone.

Another example of a performance analysis tool is disclosed in U.S. Pat. No. 6,311,175 to Adriaans et al. The Adriaans system and method involves automatically creating performance models of complex information technology (IT) systems. System components are periodically monitored to determine performance thresholds. A continuity analysis is then performed by synchronizing testing functions associated with the predetermined system performance thresholds. Data obtained from this analysis is used to develop models of the system that may be used to analyze system performance for another configuration of the system.

The Adriaans approach monitors an existing system to develop a performance model. The model may then be used to approximate the performance of an alternative system configuration. Therefore, this method cannot be used unless a working configuration of the system in question exists. However, as discussed above, it is generally desirable to conduct some performance analysis on a data processing system while the system is still in the design stages so that problems can be more easily addressed. This cannot be accomplished using the Adriaans system.

U.S. Pat. Nos. 5,960,181 and 5,978,576, both to Sanadidi et al., describe a system for simulating the various aspects of massively parallel processors. The system includes a processor that executes a simulation program. The simulation program includes multiple software submodels, each simulating the operations of a respect aspect of the system. Data is passed between the submodels using procedure calls.

The system described by Sanadidi et al. is a complex software system that must be developed and tested. That is, each portion of the system under test is associated with a software component. The test software must be designed and tested in what may require a substantial development effort. In today's fast-paced environment, this type of significant effort may not be possible where a test vehicle is concerned, particularly when the focus is on getting the primary product (i.e., the data processing system) to market quickly.

Still another alternative approach is described in U.S. Pat. No. 6,266,804 B1 to Isman. In Isman, a graph is developed that describes the execution of a particular software application upon a particular parallel processing system. Based upon the graph and supplied numerical data that describes empirically determined details about the data processing system, an analysis is made concerning the performance of the particular software application running on the system.

Isman models the performance of a particular software application running on a particular hardware configuration. The Isman approach is not adapted to measure the performance of the data processing system alone. What is needed, therefore, is an improved system and method for analyzing the performance of various configurations of a data processing system.

SUMMARY OF THE INVENTION

The current invention provides an improved system and method for completing performance analysis on a target system. According to one embodiment, the target system is a data processing system, although the inventive concepts described herein may be applied to many types of electrical, mechanical, or other types of system.

According to the current invention, different types of configurations files are created, each to describe one or more respective aspects and/or portions of the target system. Each of these file types may include a combination of parameter values and equations that describe the respective portion of the system. Multiple files may exist for each file type, with each file describing a different version of the system represented by variations of the parameter values and equations.

After the configuration files are defined, scenarios are created. A scenario includes a set of files, with some or all of the files being of different file types. The files included within a scenario provide all parameter values and equations needed to calculate performance data for a particular revision of the target system. Next, a performance study is defined to include one or more of the scenarios. The performance study will explore the affects of the system variations embodied by the scenarios on the performance of the target system.

Finally, for each scenario in the performance study, a user is allowed to specify one or more parameter values and/or equations that will be used to replace one or more other parameter values and/or equations that are included within one or more of the configuration files used to create the scenario. This provides a mechanism whereby a user can easily override a value or equation that is included within one or more of the configuration files without having to update the file itself.

After all data for the performance study is specified, the performance analysis is initiated. This involves substituting parameter values included in the configuration files into the appropriate equations that are also included within the configuration files. During this process, the calculation employs any user-specified parameter values and/or equations instead of default values included in the configuration files. This process results in the calculation of performance data for each of the scenarios in the performance study.

According to one aspect of the invention, a detail report is provided for each scenario in the study. This report, which may be referred to as a detail sheet, includes all parameter values and equations specified by the configuration files included in the scenario. This sheet further includes all performance data calculated for the scenario.

According to yet another aspect of the invention, a summary report is created. The information included in this summary report may be selected by a user based on the system aspects that are being investigated by the performance study. In one embodiment, the summary report includes multiple columns, with each column providing the performance data for a respective one of the scenarios in the study. This facilitates an easy side-by-side comparison of the performance data developed for each of the scenarios in the study. This type of comparison may be useful to a system designer when deciding between various design choices that may be employed within the target system. This type of data may also be useful to a consumer who is deciding which of several system configurations should be selected for purchase.

The foregoing structure allows a user to easily mix and match different aspects of a target system to perform "what-if" architectural performance studies. In one embodiment, an automated scenario manager program is provided that consolidates the parameters and equations from the different files into the scenarios. This program may be implemented using a spreadsheet application. Calculations are then performed using the equations and parameters included within the scenario. Finally, comprehensive and summary reports are created using the analysis results in the manner described above. These reports may be provided in the form of one or more spreadsheets.

The foregoing may best be understood by example. In one embodiment related to a data processing system, a first type of file may be created to store information describing the instruction processors included within the system. This type of file may store parameters associated with a processor's clock speed and first-level cache size. This file may also include equations that can be used to calculate latency associated with various types of processor requests. A second file type may be defined to describe a data processing platform, including parameters that identify system clock and bus speeds, and types and sizes of main memory. This file might also include equations that describe latency and other aspects associated with the various paths within the system. Yet another type of file may be created to describe parameters and equations associated with workload levels. Performance analysis data may then be developed using the parameters and equations. This data includes such metrics as the average number of clock cycles needed to complete execution of a single instruction.

In one embodiment of the invention, a method of analyzing a target system is disclosed. The method includes the steps of defining multiple different types of configuration files, each describing one or more attributes of the target system, and defining at least one scenario, each scenario including multiple configuration files, at least some of which are of different types. The method may further include calculating, for each scenario, performance data for the target system based on the attributes described by the configuration files included in the scenario.

According to another aspect of the invention, a system for analyzing the performance of a target system is provided. The system includes a storage device to store multiple configuration files, each including data descriptive of a portion of the target system. The system further includes a user interface coupled to the storage device to define multiple scenarios, each scenario including a selected set of the configuration files, and a processor coupled to receive data from the storage device. The processor is provided to calculate performance data for at least one of the multiple scenarios using the descriptive data that is included within the set of configuration files selected for the scenario.

According to another aspect, a method of analyzing a target system is disclosed. The method includes the steps of defining multiple types of files, each including data describing one or more respective attributes of the target system, and defining multiple scenarios, each including multiple files, at least some of which are of different types. The method may also include selecting one or more scenarios for inclusion in a performance study, and, for each scenario included within the performance study, calculating performance data for a target system that has the attributes described in the files included within the scenario.

In yet another embodiment, a system for analyzing a target system is provided. The system includes means for defining multiple types of configuration files, each including parameters and equations describing one or more related aspects of the target system. The system further includes scenario manager means for defining one or more scenarios, each including multiple configuration files and describing a particular revision of the target system, and processing means for calculating performance data for ones of the scenarios defined by the scenario manager means.

Other aspects of the invention will become apparent from the following description and the accompanying drawings.

BRIEF DESCRIPTION OF THE DRAWINGS

FIG. 3A is a screen display provided by one embodiment of scenario manager.

FIG. 4 is a table illustrating one embodiment of a system configuration file.

FIG. 5 is a table illustrating one embodiment of a CPU characterization file.

FIG. 6A is a table illustrating one embodiment of a workload characterization file.

FIG. 6B is another table illustrating one embodiment of a workload characterization file rated to cache miss rates.

FIGS. 7A and 7B are tables illustrating exemplary portions of a model sheet.

FIG. 8 is a table that correlates parameter names with parameter location information.

FIG. 9 is an exemplary index file.

DETAILED DESCRIPTION OF THE INVENTION

A. Description of an Exemplary Data Processing System

Figure 1:
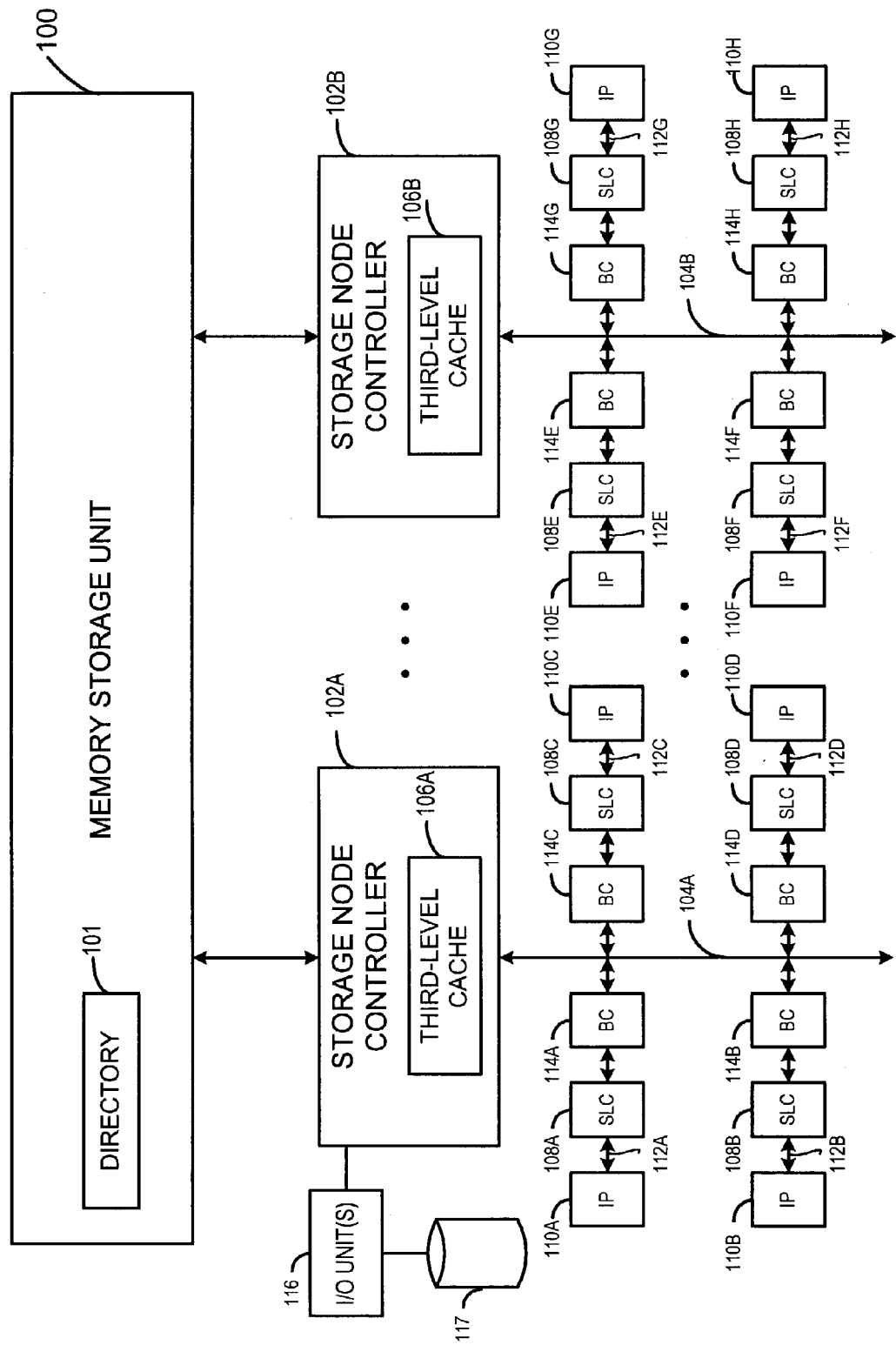
FIG. 1 is a block diagram of a data processing system that may by analyzed using the current invention.

FIG. 1 is a block diagram of a data processing system that may by analyzed using the current invention. Of course, any other type of data processing system and architecture may be similarly analyzed using the subject analysis tool, and the system of FIG. 1 is merely described for exemplary purposes. This system includes a memory storage unit (MSU) 100 that provides the main memory facility for the system. MSU 100 may include random access memory (RAM), read-only memory (ROM), and any other type of memory known in the art. The system may optionally include additional MSUs that are coupled to each other via a cross-bar interconnection.

In exemplary system, MSU is a directory-based storage unit. MSU retains information in directory 101 that indicates where the latest copy of requested data resides within the system. This is necessary since data from MSU 100 may be copied into any of the various cache memories within the system. Directory 101 tracks the latest copy of the data to ensure that every processor is operating from this copy. Directory 101 may include a directory entry that tracks the location of each block of memory within the MSU, where a memory block is of a predetermined size and is referred to as a "cache line".

MSU 100 is coupled to one or more Storage Node Controllers (SNCs) shown as SNCs 102A and 102B. The system of the current invention may include more or fewer SNCs than are shown in FIG. 1. Each SNC is coupled to MSU 100 over one or more high-speed MSU interfaces that each includes data, address, and function lines. For simplicity, each SNC is shown coupled to MSU 100 over a single interface. Each SNC may further be coupled to another MSU in an expanded embodiment.

Each SNC includes logic to interface to the high-speed MSU interface, and further includes logic to interface to a respective processor bus such as processor buses 104A and 104B. These processor buses, which are also referred to as the Front-Side Buses (FSBs), can employ any type of bus protocol. Each SNC may further include a respective cache and all supporting logic. This cache may be a Third-Level Cache (TLC), a Fourth-Level Cache (4LC), or some other type of cache memory. In the embodiment shown, SNCs 102A and 102B include TLCs 106A and 106B, respectively. Finally, each SNC may be coupled to one or more I/O units shown as I/O units 116. One or more peripheral units such as peripheral disks 117 may be coupled to each of I/O units 116.

As noted above, each of SNCs 102A and 102B is coupled to a respective processor bus 104A and 104B. Each processor bus further couples to multiple local cache memories through respective Bus Controllers (BCs). Each BC controls the transfer of data to and from the processor bus in a manner that conforms to bus protocol. In the current embodiment, Second-Level Caches (SLCs) 108A–108D are coupled to processor bus 104A through BCs 114A–114D, respectively. Similarly, SLCs 108E–108H are coupled to processor bus 104B through BCs 114E–114H, respectively. In another system configuration, these local caches may be Third-Level Caches.

Each SLC 1088 is also coupled to a respective one of the Instruction Processors (IPs) 110A–110H over a respective interface 112A–112H. For example, SLC 108A is coupled to IP 110A via interface 112A, SLC 108B is coupled to IP 110B via interface 112B, and so on. An IP may be any type of processor such as a 2200™ processor commercially available from Unisys Corporation, a processor commercially available from Intel Corporation, or any other processor known in the art. Each IP may include one or more on-board caches. In the exemplary system, each IP includes a First-Level Cache (FLC). Preferably, each IP resides on a single Application Specific Integrated Circuit (ASIC) device with a respective SLC 108. Alternatively, an IP may be coupled to a respective SLC over an external interface. The associated BC may or may not be integrated with the SLC logic, and may also reside within the same ASIC.

An SNC, its respective processor bus, and the entities coupled to the processor bus may be referred to as a "processing node". In the current example, SNC 102A, processor bus 104A, and all entities associated with processor bus including BCs 114A–114D, SLCs 108A–108D, and IPs 110A–110D may be referred to as a processing node. Similarly, SNC 102B, processor bus 104B, and all entities associated with processor bus 104B comprise a second node.

During execution, an IP is accessing programmed instructions and data from MSU 100 and its respective caches. For example, when IP 110A requires access to a memory address, it first attempts to retrieve this address from its internal cache(s) such as an FLC. If the requested address is not resident in the FLC, a request is sent to the respective SLC 108A. If the requested data is likewise not resident within the SLC, the SLC forwards the request to the processor bus 104A.

In the current system, all SLCs on a processor bus implement a snoop protocol to monitor, or "snoop", the processor bus for requests. SLCs 108B–108D snoop the request provided by SLC 108A on processor bus 104A. If any of these SLCs stores the requested data, it will be returned to requesting SLC 108A via processor bus 104A. Additionally, SLCs 108B–108D may have to invalidate any stored copies of the data depending on the type of request made by SLC 108A. This is discussed further below.

SNC 102A also snoops the request from SLC 108A. SNC 102A determines whether TLC 106A stores the most recent copy of the requested data. If so, the data will be provided by SNC 102A to the SLC 108A.

In some instances, data requested by IP 102A is not resident within any of the cache memories associated with processor bus 104A. In that case, SNC 102A must forward the request to MSU 100. MSU 100 determines the location of the current copy of the requested data using information stored within its directory 101. The most current copy may reside within the MSU itself, or may reside within a cache memory that is associated within one or more other processing nodes in the system, as indicated by state bits within directory 101. In the former case, the MSU provides the data directly to SNC 102A. In the latter case, the MSU must issue a "return" command to these other node(s) requesting that the data be returned to MSU 100 so that it may be forwarded to SNC 102A.

In the exemplary system, data is retrieved from, and written to, MSU 100 in cache lines, where a cache line of the current embodiment is defined as a predetermined number of contiguous bytes of memory. As discussed above, directory 101 records directory information on a cache-line basis. The various caches within the system also track memory on a cache-line basis.

B. System Analysis

It is generally desirable to conduct performance analysis on a system design before hardware is available. If a bottleneck is discovered, it can be addressed before time and money has been wasted building a sub-par prototype. One type of tool that has been used for this purpose is a performance analysis tool that employs queuing equations to determine throughput for some, or all, paths within the system. In this type of analysis, a set of equations is developed to model the latency associated with system paths. These equations take into account the minimum latency governed by intrinsic propagation delays, which is generally dependent on the type of technology used to implement the system. The equations also take into consideration the workload being experienced by the system. As will be appreciated, as the number of requests being issued within a predetermined period of time increases, some requests must wait to be presented to shared resources, thereby increasing the overall time required to process a given request.

Performance analysis also takes into account choices that may be associated with modular system configurations. For example, in the system described above, the number of I/O units 116, IPs 110, SLCs 108, BCs 114, SNCs 102, and MSUs 100 included within the system can be selected by the user based on need. The amount of memory contained within an MSU 100, TLC 106, or SLC 108 may also be varied. System clock speeds, the speeds of paths such as processor buses 104, and the type of IPs 110 included within the system may be, to some extent, selectable by a user or a system designer. Analysis can be conducted to provide information on how making one of these choices will affect system operations.

As one example of the type of performance analysis that might be involved with the subject invention, one or more queuing equations may be developed to describe the time required to present a request to processor bus 104 following a cache miss to an associated SLC 108. These equations must take into account propagation delays within the SLC 108 and the associated BC 114. The analysis must also take into account any times the request is likely to spend waiting within a queue structure within either the SLC or BC. Further, the equations must consider the times required to gain access to processor bus 104. These latter considerations will depend on request traffic levels within the system.

To perform a comprehensive study of a system, a model is developed which may contain many thousands of equations, each associated with a particular path or aspect of the system. Some of these equations may receive as inputs those values that are provided by a user to describe the types of system aspects discussed above. Equations may also receive as inputs values that are calculated using one or more other equations. The equations can then be executed to determine system throughput for a particular system configuration.

Prior art tools that support the mechanism described above utilize a single comprehensive model that specifies the type and number of system components. The model further indicates clock, bus, and processor speeds, workload levels, and all of the other system parameters that are needed by the queuing equations to determine system throughput. If analysis is to be performed on another system configuration, another comprehensive model is developed from scratch, or the previously developed model is modified. The models are very large, and developing a single model is tedious and time consuming. Moreover, comparisons between multiple models are performed manually by evaluating multiple listings, each obtained during a respective performance analysis run. Because this mechanism is so cumbersome, performing an extensive performance study involving all possible system configurations is generally not possible.

The current invention provides an improved system and method for completing performance evaluations using a modular approach. Separate files are created to store different types of parameters and equations. In one embodiment, a first file stores information describing the IPs 110 within the system. For example, this file may store parameters associated with an IP's clock speed and first-level cache size. This file may also include equations that can be used to calculate latency associated with various types of IP requests. Another file, which describes the data processing platform, includes parameters that identify system clock and bus speeds, and specify the type and size of main memory. This file also includes equations that describe latency and other aspects associated with the various paths within the system. Yet another type of file is created to describe parameters and equations associated with workload levels. Each of these types of files is organized in a common manner using a standard format that is easy to understand and use.

The foregoing structure allows an analyst to easily mix and match different aspects of a data processing system to perform "what-if" architectural performance studies. An automated program is provided that consolidates the parameters and equations from the different files into a scenario. Calculations are then performed using the equations and parameters included within the scenario. Finally, reports are created using the analysis results. In one embodiment, a summary report is created that includes selected parameter values, as well as a selected portion of the performance analysis results. The information included in this summary report may be selected by a user based on the system aspects that are being studied in the scenarios covered by the report. This will be discussed further below.

Figure 2:
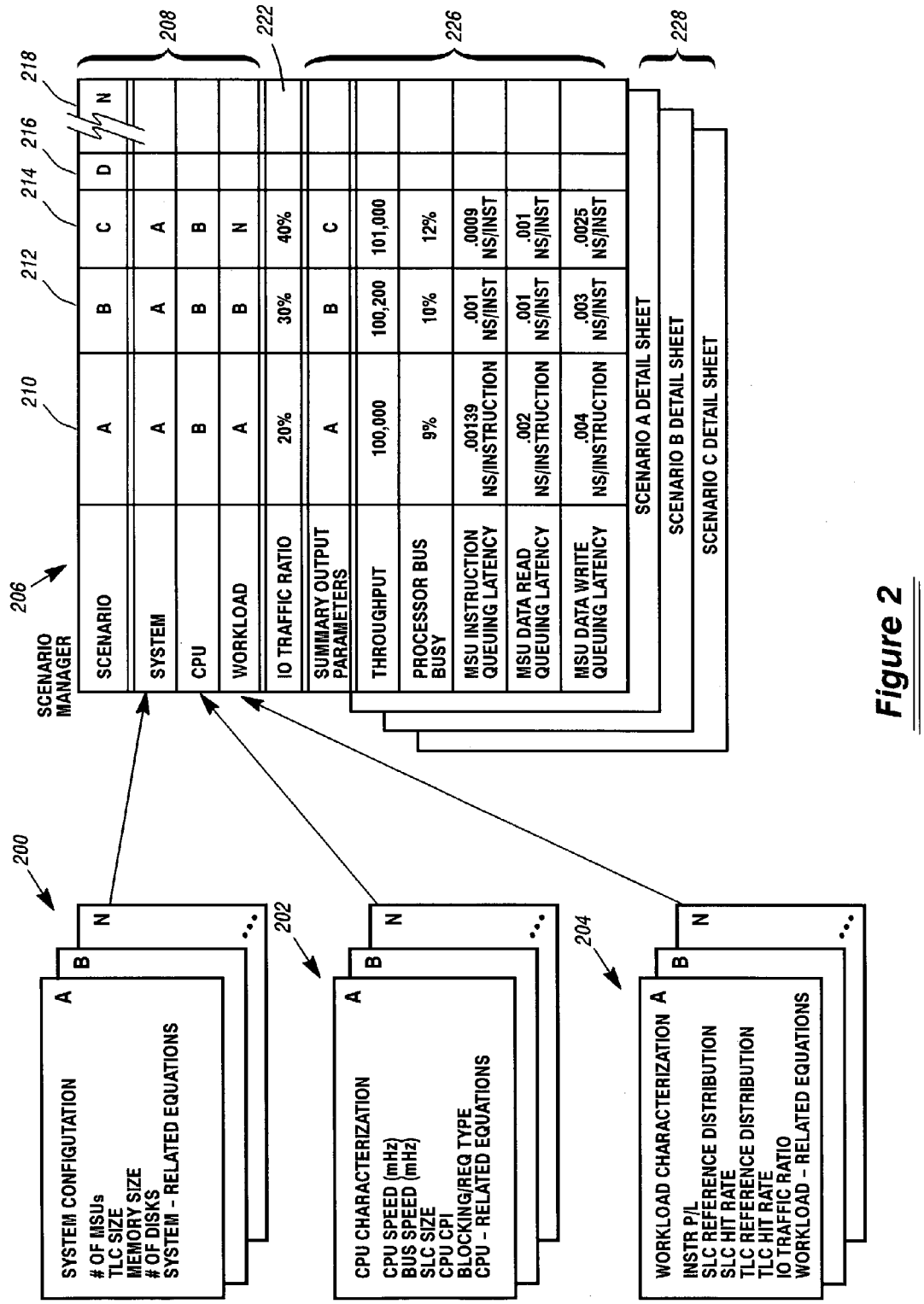
FIG. 2 is a block diagram illustrating one embodiment of the invention.

FIG. 2 is a block diagram illustrating one embodiment of the invention. In this embodiment, three types of files are defined. The first type, shown as system configuration files 200, include the parameters that are associated with the data processing system platform. These parameters include the number of MSUs 100 within the system, the size of each MSU 100, the size of TLCs 106, and the number of peripheral disks 117 included within the system. The system configuration files also include system-related equations that describe the various logic paths and aspects of the system platform.

Any number of one or more configuration files may be defined. In FIG. 2, system configuration files "A" through "N" are shown. Each of these files is associated with a different system configuration. A configuration file may include one or more equations that are different from those equations included within one or more other system configuration files. These equations could describe a logic design implementation that is included within one version of the platform but not another. Additionally, or in the alternative, a system configuration could include one or more parameter values that are different from those included in one or more of the other system configuration files. As discussed above, each of these parameters values indicates a variable aspect of the platform.

FIG. 2 also illustrates CPU characterization files 202. Each of these files includes parameters that are relevant to IPs 110 and the associated memory and bus logic. For example, these files include parameters that specify the type, clock speed, and number of Cycles Per Instruction (CPI) for each IP 110. The size of each SLC 108 and the clock speed of each processor bus 104 (also referred to as a Front Side Bus, or "FSB") may also be specified.

In a manner similar to the system configuration files, CPU characterization files include queuing equations, shown as CPU-related equations in FIG. 2. These equations describe the latency and other functional aspects related to the logic design of a particular IP 110. For example, one or more equations may describe latency associated with accessing an SLC 108. Because the specific equations that are utilized during analysis of a particular system are dependent on system architecture and technology choices, the details associated with these equations are not relevant to the invention, and are not discussed in detail.

Any number of CPU characterization files may be defined. In this example, files "A" through "N" are illustrated. As discussed above in reference to the system configuration files, each file may include equations and/or parameters that differ from those included within a different CPU characterization file.

Finally, workload characterization files 204 are created. These files include parameters and equations that specify the workload existing within the system. For example, these files specify instruction path length (P/L), which dictates the number of instructions executed per unit of work. The cache hit rates and reference distributions (i.e., the number of read requests as compared to write requests) are specified for both SLCs 108 and TLCs 106. The percentage of I/O versus IP requests, also referred to "IO traffic ratio", may be identified. Workload characterization files 204 each include equations related to various operational aspects of the system. For example, one or more equations that calculate request levels on processor bus 104A will take into account SLC hit rates and other request level information.

Any number of workload characterization files 204 may be defined, each including a different combination of parameters and/or equations that differ from those included within other workload files. In the current example, files "A" through "N" are defined.

Before continuing, it will be understood that the system configuration, CPU characterization, and workload characterization files shown in FIG. 2 are merely exemplary. Other types of files may be defined for use with the current invention. For example, if desired, I/O characterization files could be defined to provide I/O parameters. Additionally, it will be understood that for a typical large-scale data processing system such as is shown in FIG. 1, many more parameters would be included in each of these files than is shown in FIG. 2. The relatively straightforward example of FIG. 2 is therefore provided merely for ease of understanding.

The current invention also includes a scenario manager 206. In one embodiment, the scenario manager 206 may be implemented using any spreadsheet software product such as Microsoft Excel™ that is commercially available from Microsoft Corporation. According to the embodiment of FIG. 2, the scenario manager provides an interface that allows a user to create performance analysis studies. The interface includes a main sheet having a scenario definition section 208. This section allows a user to define one or more scenarios to be used during performance analysis. In the current embodiment, each scenario identifies the files to be used for the system configuration, the CPU characterization, and the workload characterization files. Scenario A, which is defined in column 210 of the scenario manager's main sheet, will utilize system configuration file A, CPU characterization file B, and workload characterization file A. These files will provide the parameters values and equations that will be used to complete performance analysis for scenario A. Similarly, scenario B, which is shown in column 212, will utilize system configuration file A, CPU characterization file B, and workload characterization file B. Scenario C in column 214 employs system configuration file A, CPU characterization file B, and workload characterization file N. Thus, it can be seen that this scenario study is comparing the affects of workload variation on system throughput. If desired, one or more additional scenarios may be defined from the study, as would appear in columns D 216 through N 218.

Scenarios manager 206 further provides an opportunity to override the parameter values that are included within the system configuration, CPU characterization, and workload characterization files. To do this, a user specifies a parameter name and value to be used in performing calculations for a given scenario. This can best be understood by example.

As discussed above, workload characterization files 204 each include parameters used to specify system workloads. One of these exemplary parameters shown in FIG. 2 is "IO traffic ratio". Assume for discussion purposes that each of the workload characterization files A through N assigns a value of "10%" to this parameter. Further assume that a user wants to compare the throughput for the systems defined by scenarios A, B, and N, which have IO traffic ratios of 20%, 30%, and 40%, respectively. One way to accomplish this is to modify workload characterization files A, B, and N to have the desired IO traffic ratios of 20%, 30%, and 40%, respectively. However, the IO traffic ratio value of 10% may be a default value that would be of interest for most scenarios, and changing this value for the current study would necessitate making additional file updates in the future to restore this parameter to the default value of 10%. This involves unnecessary file changes that are time-consuming, error prone, and may be difficult to track and manage. Instead, the "non-standard" values of 20%, 30%, and 40% are listed in row 222 of scenario manager. The 20% value will be used to override the default 10% value for scenario A, and so on. If desired, additional parameters may be assigned values in this manner. Any of the parameters included within system configuration files, the CPU characterization files, and/or the workload characterization files may be handled using this mechanism.

After one or more scenarios have been defined, the performance analysis may be initiated. The values of the various input parameters specified within the scenario manager main sheet, together with those parameters defined within the system configuration, CPU characterization, and workload characterization files, are copied into the appropriate queuing equations that are also stored within these files. These equations will allow the latency associated with various paths within the system to be calculated. In many cases, a first equation will provide an intermediate value that is provided as an input value to one or more other equations, and so on. For example, an output value provided by an equation included within a workload characterization file may be provided as an input to an equation included within a CPU characterization or system configuration file, and vice versa. This will be discussed further below.

According to one aspect of the invention, all input parameters for a given scenario are also copied from the specified system configuration, CPU characterization, and workload characterization files into a detailed report, or "detail sheet". For example, for scenario A defined in column 210 of scenario manager 206, all parameters are copied from system configuration file A, CPU characterization file B, and workload characterization file A into a detail sheet for scenario A, which is shown included within detail sheets 228 of FIG. 2. In addition, the IO traffic ratio value of 20% provided for scenario A is also copied to this sheet. In this manner, a detail sheet is created for each of the scenarios. This provides a means whereby the user can view all parameter values associated with a given scenario from a single source, rather than by referencing the contents of three separate files as well as the main sheet.

After all performance calculations have been completed for a given scenario, selected ones of the calculated performance values may be copied into a summary output parameters section 226 of the scenario manager main sheet. The performance values that are to be copied in this manner are specified by the user. In the current example, the user has chosen to view the system throughput, and has further elected to view values that provide information associated with varying workload levels, such as queuing latency, and bus usage percentages. By displaying only those values that are of the most interest for a particular performance study, an easy side-by-side comparison of test results can be performed by the user. The user is not required to reference multiple comprehensive output listings to search for values of interest, as is necessitated by prior art systems.

In a manner similar to the way the input parameter values are handled, the current invention further copies all calculated performance values for a given scenario to the appropriate one of detail sheets 228. For example, all intermediate and final values calculated for scenario A are copied to the scenario A detail sheet, and so on. This allows a user to perform more in-depth comparisons between the scenarios than could be performed using only those values that were copied to the summary output parameters section 226.

FIG. 3A is a diagram of the main sheet that is provided by one embodiment of scenario manager 226. In this embodiment, the scenario manager is implemented using Microsoft Excel™, which is commercially available from the Microsoft Corporation. As in the embodiment shown in FIG. 2, the scenario manager of this embodiment provides access to additional detail sheets that are accessed in a manner to be described below.

The top portion of the main sheet includes several selectable utilities 300 shown as "Load", "Re-Load", "Load&Run", "Run", "Save", and "Exit". In this exemplary embodiment, these utilities are implemented using Excel VBA macros, as will be discussed below.

In a manner similar to that shown in FIG. 2, scenario manager allows for the creation of multiple scenarios. These scenarios are listed in row 302 as scenarios "A1" through "A5". The next rows 304 identify the system configuration file that will be used for each scenario. For example, the system designator "Sys1" and revision designator "v5f" are used to select the system configuration file that will be used for scenario A1. In one embodiment, these two designators are used to reference a two-dimensional index file to obtain the file and path name to be used for scenario A1. This will be discussed further below. It may be noted that in another embodiment, a single designator could be used to identify the system configuration file that is to be used for a particular configuration. In yet another embodiment, the system configuration file could be specified by directly listing the actual file and path names within the main sheet of FIG. 3. However because these names are lengthy, and because directory paths may be subject to change as network modifications are made, this is not preferred. If desired, a comment may be included to describe the system configuration that is being used within a given scenario.

Following the system configuration file designators in rows 304, input parameter values for the system configuration files are provided in rows 306. As noted in reference to FIG. 2, these values are used to override default parameter values that are specified within the designated system configuration file. For example, assume that the parameter PCT.SNP.STALL in the first of rows 306 has a default value of 5% in the identified system configuration file for scenario A1. This default value will be overridden by the new value of 0% provided for this scenario.

It may be noted that some of the parameters within rows 306 are provided with alphanumeric values. For example, parameter MSU.DLYD.INV.ACK is provided with a value of "N" for scenario A1. These parameter values may be used as a conditional flag for selecting between multiple equations included within the system configuration file. For example, a first equation may be used to calculate a particular performance value if the parameter MSU.DLYD.INV.ACK is set to "N", otherwise, a second equation is used to calculate this performance value. This provides a flexible mechanism for allowing multiple design options to be described within a single system configuration file. This provides an alternative to the mechanism described above wherein separate system configuration files are defined when different equations are to be used. In yet another alternative embodiment, an alternative equation could be listed directly within the main sheet in a manner similar to the way in which parameter values are listed to override default parameter values. In this case, the alternative equation is used to calculate the parameter rather than a default equation that is provided in the system configuration file for that parameter.

Following rows 306 are rows 308, which identify the file to be used as the CPU characterization file. As discussed above, the file may be identified using one or more identifiers that are used to reference an index file. The index file provides the CPU characterization file name and directory path that matches with the specified identifiers, as will be described below.

Rows 310 list the parameter values that are used to override default values provided in the CPU characterization file. In a manner similar to that described above, some parameters are assigned alphanumeric values that may be used as flags to select between multiple equations provided to calculate a particular performance value. In still another embodiment, alternative equations could be provided for some parameters.

Rows 312 and 314, which relate to workload specifications, are used in a manner similar to that described above for system configuration files. That is, rows 312 provide a file identifier and a revision identifier. These identifiers will be used to reference an index file to select a file and path name that will be employed to retrieve a selected workload characterization file. Rows 314 provide any values used to override those provided as defaults within the selected workload characterization file.

Also shown in FIG. 3A is an output summary section 315, which corresponds to the summary output parameters section 226 of FIG. 2. As discussed above, this section contains calculated performance data that is selected by the user as being of particular interest to the current study. In this example, the user selects various throughput values for display, including the output parameter "Throughput". In this example, this output parameter is defined as a vector, as may be accomplished using spreadsheet programs such as Microsoft Excel™, and as is known in the art. In the current embodiment, each member of the vector is associated with a respectively different system configuration designated "1x" through "64x". In this case, configuration "1x" corresponds to a system having a single IP 110. Similarly, configuration "2x" involves a system having two IPs, and so on. When a vector parameter is selected for display within output summary section 315, all members of the vector are displayed.

Other output parameters are selected for display within output summary section 315. For example, vector output parameter Cycles Per Instruction, or "CPI" is included within this output report. Similarly, the vector parameter "MP Factor", which relates to a factor of the computing power gained by adding additional IPs to a system, is selected for display.

The embodiment of FIG. 3A further provides various additional detail sheets that may be selected using tabs 316, as is known in the art. As discussed above, these sheets provide the comprehensive input and output parameter listings for each of the scenarios. By referencing a particular detail sheet, a user can obtain more complete performance analysis data than is provided on the main sheet, which only includes a relatively small sub-set of the input and output parameters.

As discussed above, the scenario manager includes various selectable utilities 300 shown as "Load", "Re-Load", "Load&Run", "Run", "Save", and "Exit". In one embodiment, these utilities may be implemented using Excel VBA macros. They may also be implemented using any other script language or software programming language.

In one embodiment, when the user selects the "Load" utility, the files specified in the main sheet are opened. The parameter values included in these files are copied to the detail sheets represented by tabs 316 of FIG. 3. Similarly, the "Re-Load" utility re-loads any detail sheets from the specified files if these sheets already exist. This allows a user to modify the configuration and characterization files and re-run the study, if desired.

The scenario manager utilities further include a "Run" function. When this function is selected, the input parameters for a given scenario are obtained from the detail sheets represented by tabs 316 and substituted into the queuing equations being used for that scenario. Any input parameter values that are specified within the main sheet are used to override the default input values that are provided in the specified files, as discussed above. After execution, the results are copied to the associated detail sheet. The selected results are also copied to the output summary section within the main sheet of the scenario manager.

Other utilities provided by the scenario manager may include the "Load & Run" function, which is selected to perform the same operations that may be initiated when the "Load", then the "Run", utilities are selected in succession. The "Save" function allows a user to save the entire study, including the main sheet and the associated detailed sheets, for future reference. Finally, the "Exit" utility is selected to exit the scenario manager.

Figure 3B:
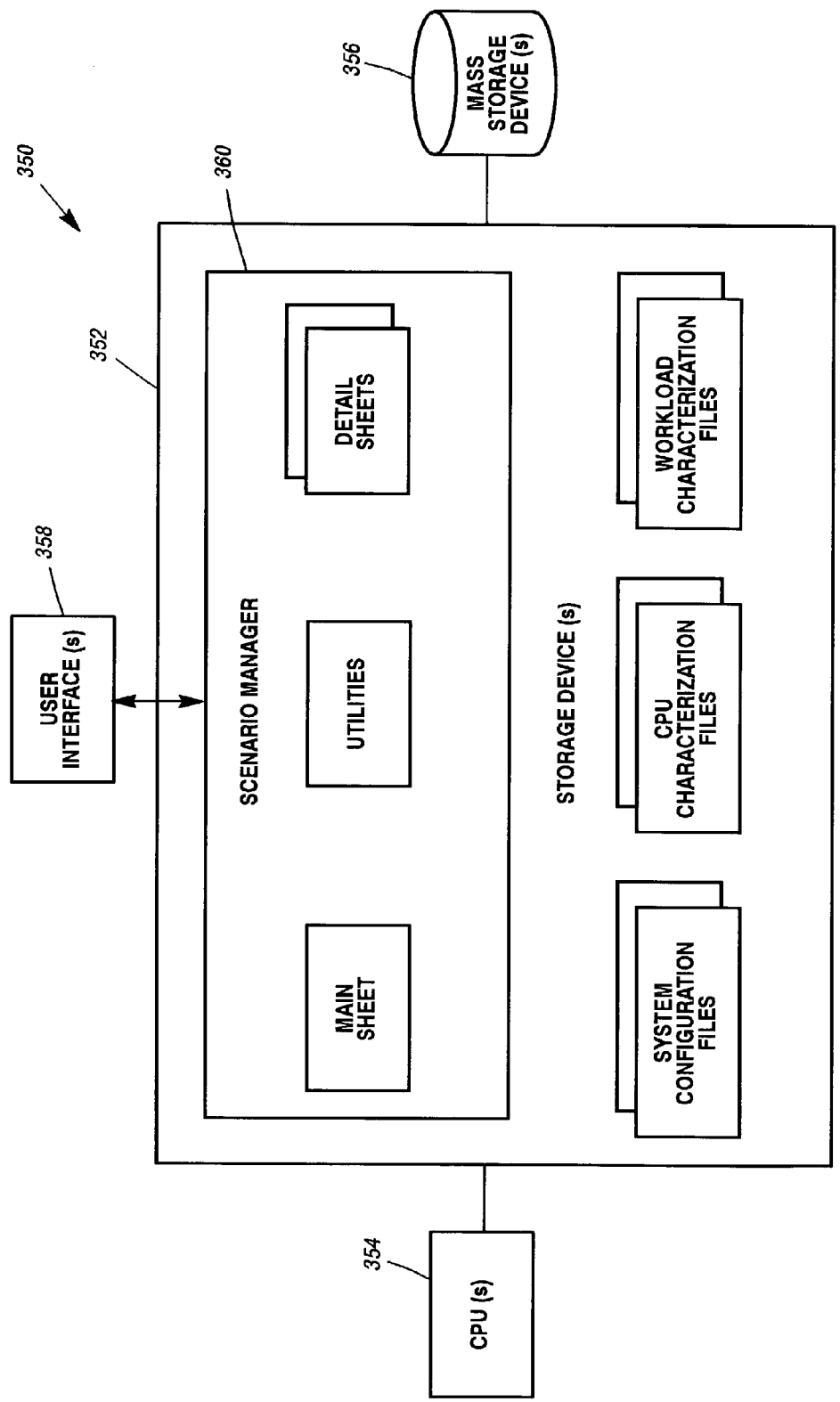
FIG. 3B is a block diagram of one type of data processing system used to implement the current invention.

FIG. 3B is a block diagram of one type of data processing system used to implement the current invention. This data processing system 350 includes a storage device 352 that may be a main memory or any other storage device known in the art. Storage device 352 is coupled to one or more Central Processing Units (CPUs) 354, and may further be coupled to one or more mass storage devices 356, which may include CD ROMs, hard drives, and/or some other type of mass storage device. Storage device 352 may also interface with one or more user interfaces 358 such as display monitors, keyboards, cursor control devices, voice or touch activated mechanisms, and/or any of the user interfaces available now or in the future. In practice, system 350 may be a personal computer, a workstation, a large-scale data processing system, or any other type of data processing system having components similar to those shown in FIG. 3B.

Storage device stores scenario manager 360, which may be implemented using any spreadsheet program, database utility, or another type of software program capable of managing multiple revisions of data files or other data constructs. In an exemplary embodiment, scenario manager 360 is implemented using Microsoft Excel™.

Scenario manager includes a main sheet 362, as discussed above. In one embodiment, when scenario manager is invoked, the main sheet is displayed for a user that is employing one or more of user interfaces 358. This main sheet allows a user to define various performance scenarios, and in one embodiment, provides a summary report that can be tailored by a user to display particular performance values of interest to a study. Main sheet 362 further provides an interface for invoking any one or more of selectable utilities 364 provided by scenario manager. These utilities allow a user to initiate functions associated with performance analysis such as loading files, running the analysis, and saving results. In one embodiment, these utilities are implemented using macros. Finally, main sheet 362 may provide access to one or more detail sheets 366 that are created to supply detail information related to each defined scenario.

According to the current invention, performance studies are defined by creating one or more scenarios. Each scenario includes multiple types of data and equations. For example, in the current embodiment, these types include system configuration, CPU characterization, and workload characterization equations and data. These data and equation types may be stored in respective file types, shown as system configuration files 370, CPU characterization files 372, and workload characterization files 374. When performance analysis is initiated, these files may be loaded into storage device 352 from mass storage device 356. Alternately, these files could reside within storage device 352 on a more permanent basis so that loading is unnecessary. After the files are loaded into storage device(s) 350, performance analysis may continue in the manner discussed above.

FIG. 4 is a table illustrating one embodiment of a system configuration file. The rows of the table are generally each associated with a different parameter. Some of these parameters are provided as inputs to queuing equations. For example, "Sys MHz" in the first of rows 408 is a parameter that specifies a system clock speed. Others of the parameters are calculated using respective equations. The particular significance assigned to each parameter is beyond the scope of the current invention, and will therefore not be described in any detail. It is sufficient to note that these parameters are dependant upon the architecture employed for the target data processing system, which is exemplified by the system of FIG. 1.

Rows 408 of the spreadsheet of FIG. 4 include several columns. In column 400, a brief description is provided for each parameter. In column 402, an optional parameter name is identified. This parameter name may be used to identify the parameter. For example, this parameter name may be called out within the main sheet of scenario manager to indicate that the parameter is to be assigned a specified value that will override a default value. Alternatively, this parameter name may be used to indicate that the calculated value of that parameter is to be copied into output summary section 315 (FIG. 2) of the main sheet. Instead of using the parameter name, each parameter can be identified using the number of a spreadsheet row that contains the parameter. For example, "Sys MHz" in the first of rows 408 may be identified as the parameter within row one of the system configuration file shown in FIG. 4. However, because a row number does not convey the information an alphanumeric name conveys, parameter names are generally assigned to at least the parameters that will be called out in the main sheet. These names may also be used to lend user-readability to an equation utilizing that parameter, as will be discussed below.

The spreadsheet of FIG. 4 also includes column 404. If the parameter that is associated with a given row is an input parameter, the value assigned to this parameter by a user will appear within the cell of column 404 for that row. If the parameter has a value that will be calculated during performance analysis, the associated cell within column 404 will eventually store the value that is calculated during the analysis.

Selecting a particular cell, as may be performed by placing a cursor within that cell, will result in the display of any equation that is used to calculate the parameter, along with any optional comment this is provided for the parameter. For example, assume that the parameter appearing in the second of rows 408, and which is assigned the name "BSBMHZ", is to be assigned the same value that is assigned to the input parameter listed in the first of rows 408 (i.e., the parameter assigned the name "SYS.MHZ"). Selecting cell 409, as may be accomplished using a cursor, keystrokes, or some other user interface mechanism, will result in the display of the equation describing this relationship. This is illustrated by the equation appearing within window 405, which sets BSBMHZ equal to SYS.MHZ. A comment to this effect appears in window 407. The actual value of BSBMHZ will be stored within cell 409 after the calculation is performed. If parameter BSBMHZ is an input parameter that is not associated with an equation, selection of cell 409 will result in window 405 remaining blank.

As is discussed above, a value calculated for a parameter such as BSBMHZ may be used as an input to another equation stored within the system configuration, CPU characterization, or workload characterization file. Alternatively, values calculated using equations provided in one of the characterization files could be provided as an input to an equation in either of the other types of files. The level of nesting in this manner may be unlimited.

Additional parameters are listed in rows 406. In a manner similar to those parameters defined in output summary section 315 of FIG. 3, these parameters are defined as vectors, meaning that the parameter includes multiple members of a vector set. A vector parameter may be an input parameter, meaning that each member in the vector will be assigned a value before calculations are performed. Alternatively, each member may be associated with an equation that may be displayed in the manner discussed above. The equation may receive as an input one or more other vector parameters. If so, a respective one of members of the other vector parameter will be used to calculate the resulting value. For example, the vector parameter "MSU_IFs" appearing in row 410a is defined as four times the value assigned to the respectively associated vector member in row 410b, since each MSU includes four interfaces. Therefore, for each cell of row 410a, the value calculated for that cell is four times the value that appears in the cell directly above it in row 410b.

The foregoing discussion assumes that input parameters and parameters that are to be calculated during performance analysis are stored within the same sheet, as was discussed in FIG. 4. In another embodiment, input parameters that are assigned values by a user are included in an input sheet of the system configuration file. Other parameters for which values are calculated during performance analysis appear on a separate model sheet. This is discussed further below in reference to FIGS. 7A and 7B.

FIG. 5 is a table illustrating a sheet of an exemplary CPU characterization file, which may be provided as a portion of one of files 202 of FIG. 2. As discussed above, this type of file describes various characteristics associated with an IP 110, as well as related cache and bus controller logic. The parameters specify such things as CPU clock speeds, the number and size of first-level (L1) and second-level (L2) caches, latency inherent in primary paths within the CPU, and other similar CPU characteristics. These parameters may be input parameters assigned a value before calculates are begun, or may be a parameter associated with a respective equation, the value of which is calculated using other parameters as inputs. As is the case with the system parameters, the types of parameters associated with a given IP are dependent upon the type of processor using within the system.

Column 500 of the table in FIG. 5 includes a brief description of each of the parameters. Column 502 includes optional names assigned to the parameters. If a name is not assigned, the parameter may be referenced using a row number, as is discussed above. Column 504 includes the values that will be assigned to the variables in column 502, either before calculations are commenced, or as a result of a calculation. If an equation is associated with a particular parameter, the equation may be viewed by selecting the parameter cell, as is discussed above. In the manner described above, vector parameters may be defined, as is shown in rows 506.

FIG. 6A is a table illustrating a sheet of an exemplary workload characterization file that is similar to files 204 of FIG. 2. Each of rows 600 are associated with a respective workload parameter such as the percentage of I/O memory reads and writes that are being performed as compared to overall request traffic. In this example, each of the parameters shown in rows 600 is a vector parameter. In a manner similar to that discussed above in reference to FIGS. 4 and 5, column 602 includes a short description of the parameter listed in the respective row. Column 604 assigns an optional name to the parameter. Each of columns 606 corresponds to a respective value for a member of the vector parameter. As discussed above, some parameters are input parameters assigned values before calculations are initiated. Other parameters are assigned values as the results of calculations performed using associated equations. Such equations may be displayed by selecting a particular cell of interest, as described above.

FIG. 6B is a table illustrating yet another portion of a workload characterization file. This portion of the file is related to cache miss rates in a First-Level Cache (FLC) of an IP 110. Similar portions of the workload characterization file can be provided to supply cache miss rate information on other caches within the system including SLCs 108, TLCs 106, and snoop filters that are used during the snooping of processor buses 104 (see FIG. 1).

The values shown in FIG. 6B are calculated using equations that receive parameters such as cache size and reference distributions. These types of parameters may be provided in one of the configuration or characterization files, or may be supplied by a user to override a default value, as discussed above. The equations used to calculate each of the values may be viewed by selecting one of the cells of interest, as discussed above in reference to FIG. 4.

It may be noted that thousands of parameters may be associated with any of the types of files discussed above. The exemplary tables of FIGS. 4, 5, 6A, and 6B each display only a small portion of those parameters.

As noted above, in one of the embodiments, one or more of the system configuration, CPU characterization, and workload characterization files may include a sheet that includes input parameters, and another sheet, called a "model sheet", that includes calculated parameters. This is in contrast to an embodiment that includes both input parameters and other calculated parameters in the same sheet, as was described in reference to FIG. 4. The model sheet may group parameters into parameter types for ease of reference, as is shown in FIGS. 7A and 7B, discussed below.

FIG. 7A is a table illustrating a portion of a model sheet according to one embodiment of the invention. This portion of the model sheet, which is used to calculate busy rates, contains information similar to that discussed above in reference to FIGS. 4, 5, and 6. Each of the parameters shown in FIG. 7A is a vector. A respective equation for that parameter may be viewed using a window that is displayed when a particular cell of the table is selected in the manner discussed above. FIG. 7A further shows a row number in column 700 that may be utilized to identify a parameter when an optional parameter name is not defined, as will be discussed further below.

FIG. 7B is a table containing a second portion of the model sheet shown in FIG. 7A. This portion relates to queuing times. In general, the queuing times are based on the busy rates calculated by the equations for the sheet of FIG. 7A. That is, some of the equations associated with the model sheet of FIG. 7B receive as input parameters values that are calculated for the parameters shown in FIG. 7A. It may be noted that no parameter names are assigned in column 702 to the parameters of FIG. 7B, and therefore these parameters are referenced using row numbers provided in column 704.

FIG. 8 is a table that correlates parameter names with a location that stores the parameter, such as a row of a spreadsheet. This provides the mechanism to link these names to a value when a name, instead of a location, is used to identify a parameter. For example, in the case wherein a parameter name is used within an equation, a reference is made to a names table such as that shown in FIG. 8 to locate the parameter name, as may appear within column 800. The location information is then obtained from column 802. In one embodiment, this location information includes the type of sheet (e.g., input versus model), as well as the row of the sheet that stores the parameter. For example, assume the names table of FIG. 8 is associated with the system configuration file. Further assume a portion of the model sheet for the system configuration file is shown in FIG. 7A. Information 806 of the names table indicates that variable "BSB.A.UTIL" 804 is located at row 432 of the model sheet. This correlates to the row number provided for this parameter in FIG. 7A. Because the names table can be listed in some searchable order, such as an alphabetical order, performing a search of the names table for a given parameter can be completed more efficiently than searching an entire spreadsheet, or even a portion of a spreadsheet.

FIG. 9 is a table illustrating an exemplary index file. Recall that according to one embodiment of the invention, this type of file may be used to locate file name and path information from identifiers used to specify the system configuration, CPU characterization, and workload characterization files. For example, returning to FIG. 3, identifiers "Sys1" and "v5f" are provided in rows 304 to identify a given file for use as a system configuration file for scenario A1. These identifiers may be used to search columns 900 and 902 of the index file of FIG. 9. When a match on both identifiers are located in row 904, the information in columns 906 and 908 of this row are selected for use in identifying the file name and path information to be used for scenario A1. If desired, more or fewer identifiers may be used to locate this information within an index file in this manner. This mechanism allows for modification of file names and path information without the need to update the main sheet of a given performance study.

Figure 10:
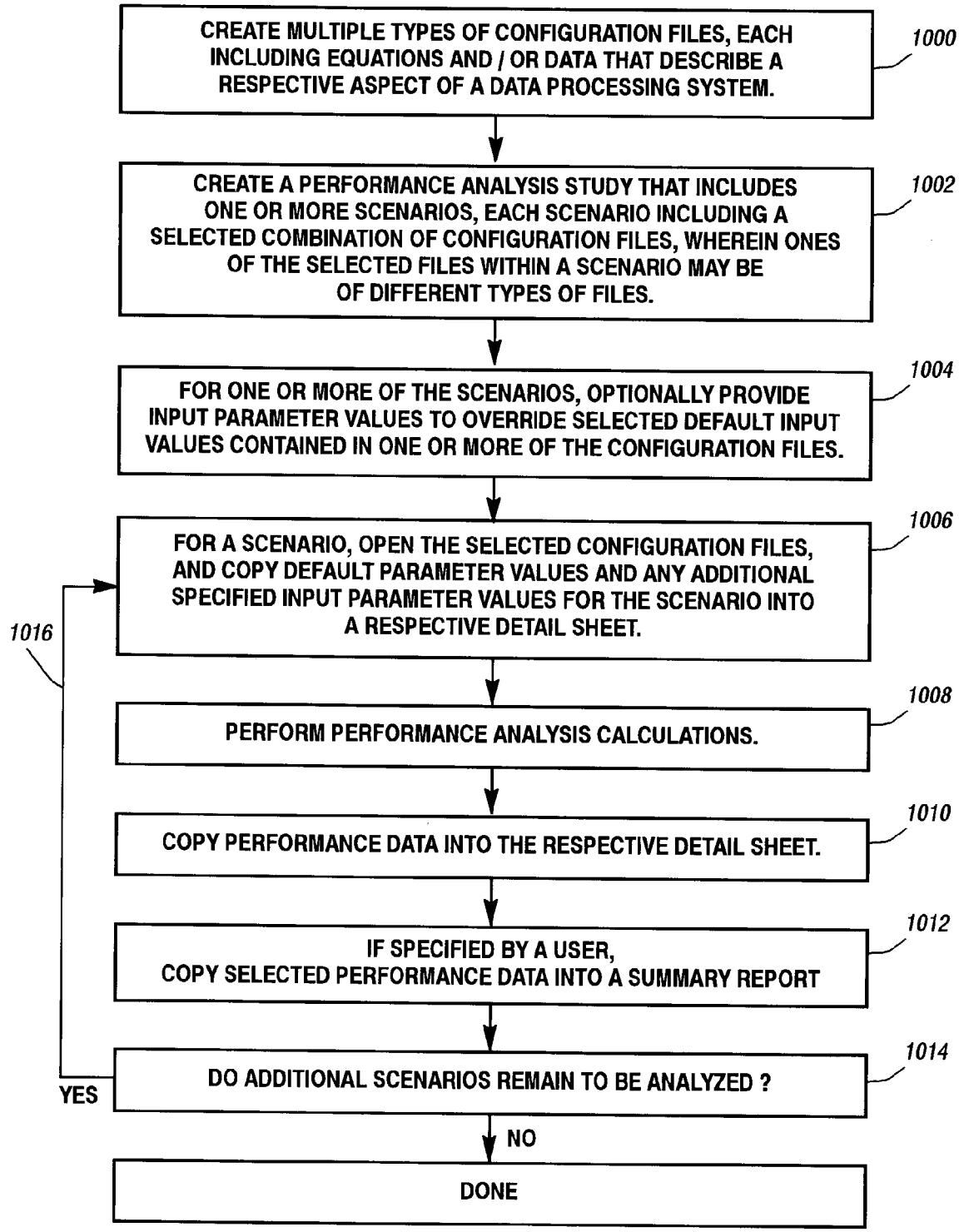
FIG. 10 is a flow chart illustrating one embodiment of a method according to the current invention.

FIG. 10 is a flow chart illustrating one embodiment of the current invention. First, multiple types of configuration files are created, each including data and/or equations that describe a respective aspect of the system (1000). In the current embodiment, these configuration files include system configuration files, as well as CPU and workload characterization files. In other embodiments, different types of files may be created. For example, an I/O configuration file may be created to define aspects of the I/O system, instead of including this information within the system configuration file. In another embodiment, the memory characteristics may be included in a separate configuration file. Multiple versions of each of these file types may be created to represent different versions of the respective part of the system.

After the configuration files are defined, a performance analysis study may be created to include one or more scenarios (1002). Each scenario specifies a selected combination of the configuration files. Each scenario may specify different types of files. For example, in the current embodiment, each scenario specifies a system configuration, and a CPU and workload characterization file. In another embodiment, each scenario may identify a different combination of files. For example, each scenario might further include an I/O configuration file.

In an alternative embodiment, scenarios need not include the same combination of files. For instance, assume a configuration file is defined to describe aspects related to a non-volatile memory system that may optionally be coupled to the system of FIG. 1. In that instance, some scenarios might include this additional configuration file, whereas other scenarios in the same performance study might omit this file. A study could thus be defined to compare the performance effects of including this additional component within the system.

Next, for one or more of the scenarios, input parameters may optionally be specified to override one or more default values included in one or more of the configuration files (1004). In the current embodiment, these input parameter values are listed in the main sheet of the scenario manager, as is described above in reference to FIGS. 2 and 3. It may be noted that some scenarios within a performance study may include these additional input parameters while other scenarios in the same study need not include these additional parameters, but instead use the default values.

After scenarios are defined, the files identified by a scenario are loaded (1006). In one embodiment, this involves creating a respective detail sheet for that scenario. These detail sheets are shown in FIG. 3A in reference to tabs 316. These sheets will be populated with parameter values included within the specified configuration files used to define that scenario. These sheets may further be populated by any additional values that are provided within the main sheet of scenario manager to override selected default values.

Next, for each defined scenario, the system performance data is calculated for the scenario (1008). The calculated performance values are then copied to the detail sheet (1010). Optionally, some of the calculated performance values may be included within a summary report, as specified by a user (1012). In one exemplary embodiment discussed above, this summary report is provided within output summary section 315 of the main sheet (FIG. 3A). In another embodiment, this summary report could be created in a location not associated with the scenario definition. If scenarios remain to be analyzed (1014), processing is continued (1016).

It will be appreciated that many alternative embodiments of the foregoing system and method are possible within the scope of the current invention. Thus, the above-described embodiments are to be considered exemplary only, with the scope of the invention to be indicated only by the claims that follow, rather than by the foregoing description.

What is claimed is:

1. A method of analyzing a target system having one or more processors, comprising:
   a.) defining multiple different types of configuration files, each describing one or more attributes of the target system;
   b.) allowing a user to identify one or more sets of the configuration files, each set defining a scenario representing a respective version of the target system and describing a selected workload being processed by the processors; and
   c.) calculating and storing, for each scenario, performance data for the target system based on the attributes described by the configuration files included in the scenario.

2. The method of claim 1, whereby ones of the configuration files include default parameter values to describe ones of the attributes, and further including selecting one or more parameters values to replace one or more respective ones of the default parameter values for use during calculation of the performance data.

3. The method of claim 1, whereby ones of the configuration files include default equations to describe ones of the attributes, and further including selecting one or more equations to replace one or more respective ones of the default equations during calculation of the performance data.

4. The method of claim 1, and further including:
   selecting portions of the performance data; and
   copying the selected portions to a summary report.

5. The method of claim 4, wherein step b.) includes multiple scenarios, and further including configuring the summary report to provide a side-by-side comparison between the multiple scenarios for each of the selected portions of the performance data.

6. The method of claim 5, wherein step b.) includes defining multiple scenarios, and wherein each scenario includes the same number and type of configuration files as each of the other multiple scenarios.

7. The method of claim 1, wherein the configuration files include data selected from the group consisting of parameter values and equations.

8. The method of claim 1, wherein step b.) includes providing, for each of the multiple configuration files, at least one identifier to identify a respectively associated configuration file.

9. The method of claim 8, and further including using the at least one identifier to reference an index file to locate the respectively associated configuration file.

10. The method of claim 9, wherein the index file includes information selected from the group consisting of file name and directory path information.

11. The method of claim 1, and further including providing, for each scenario, a detail report including all calculated performance data for the scenario.

12. The method of claim 11, wherein the detail report for a scenario includes the one or more attributes described by each of the multiple configuration files included within the scenario.

13. The method of claim 1, wherein at least one of step a.) and step b.) are accomplished using a spreadsheet program.

14. A system for analyzing the performance of a target system, comprising:
   a storage device to store multiple configuration files, each including data descriptive of a portion of the target system;

a user interface coupled to the storage device to allow a user to create multiple sets of the configuration files, each set defining a scenario representing a respective version of the target system having a target data processor that is processing a selected load of work described by the scenario; and a second data processor to receive data from the storage device, the second data processor to calculate performance data for at least one of the multiple scenarios, the performance data being calculated using the descriptive data that is included within the set of configuration files selected for the scenario.

15. The system of FIG. 14, and further including a scenario manager interactively coupled to the user interface to record the selected set of configuration files for each scenario.

16. The system of claim 15, wherein the scenario manager is a spreadsheet program.

17. The system of claim 15, wherein the scenario manager includes a summary report to include portions of the performance data that are selected by the user.

18. The system of claim 17, wherein the scenario manager includes means for facilitating comparison between each of the portions of the performance data for the multiple scenarios.

19. The system of claim 15, wherein the scenario manager includes detail sheets, each detail sheet to report all descriptive data included within the set of configuration files selected for a respective scenario.

20. The system of claim 15, wherein the scenario manager includes means for allowing a user to define, for each of one or more of the multiple scenarios, descriptive data to override selected portions of the descriptive data included within the set of configuration files selected for a respective scenario.

21. The system of claim 20, wherein the scenario manager includes a utility to load user-defined descriptive data for the multiple scenarios into the detail sheets.

22. The system of claim 15, wherein the scenario manager includes a utility to initiate calculation by the second data processor of the performance data.

23. A method of analyzing a target system, comprising:
a.) defining multiple types of files, each including data describing one or more respective attributes of the target system;
b.) defining multiple scenarios, each including multiple files, at least some of which are of different types, each scenario describing work being performed by at least one data processor included in the target system;
c.) selecting one or more scenarios for inclusion in a performance study; and
d.) for each scenario included within the performance study, calculating performance data for a target system that has the attributes described in the files included within the scenario, whereby performance data for a scenario included within the performance study is capable of being compared to performance data for other scenarios included within the performance study.

24. The method of claim 23, wherein each scenario of the performance study includes the same types of files that are included within all other scenarios.

25. The method of claim 23, wherein the data describing one or more respective attributes of the target system is selected from the group consisting of parameter values and equations.

26. The method of claim 25, wherein step c.) includes selecting at least one parameter value to be included in a scenario, each selected parameter value to be used to calculate performance data for the scenario in place of a default parameter value defined by data included within one of the multiple files of the scenario.

27. The method of claim 25, wherein step c.) includes selecting at least one equation to be included in a scenario, each selected equation to be used to calculate performance data for the scenario in place of a default equation defined by data included within one of the multiple files of the scenario.

28. The method of claim 23, wherein the multiple types are selected from the group consisting of system configuration files, CPU characterization files, and workload characterization files.

29. A system for analyzing a target system having one or more processors, comprising:
means for defining multiple types of configuration files, each including parameters and equations describing one or more related aspects of the target system;
scenario manager means for defining one or more scenarios by selecting, for each scenario, a list of multiple configuration files that describes a particular revision of the target system and that further describes how data processing activities are being performed by the processors for the revision of the target system; and
processing means for calculating performance data for ones of the scenarios defined by the scenario manager means.

30. The system of claim 29, wherein the scenario manager means includes means for defining a performance study that includes multiple scenarios, and wherein the processing means includes means for calculating performance data for each of the included multiple scenarios.

31. The system of claim 30, wherein the scenario manager means includes summary report means for displaying a user-selected portion of the performance data in a summary report.

32. The system of claim 31, wherein the summary report means includes means for facilitating comparison between the user-selected portions of the performance data for each of the included multiple scenarios.

33. The system of claim 29, wherein the scenario manager means includes detail means for displaying all performance data for each of the included multiple scenarios.

34. The system of claim 29, wherein the scenario manager means includes means for allowing a user to specify parameters for one or more of the scenarios, each of the parameters to be used during calculation of the performance data in place of a respective one of the parameters included within a specified one of the configuration files of a scenario.

35. The system of claim 34, wherein the scenario manager means includes means for allowing a user to specify equations for one or more of the scenarios, each of the equations to be used during calculation of the performance data in place of a respective one of the parameters included within a specified one of the configuration files of a scenario.

* * * * *